US007890638B2

(12) United States Patent
Benco et al.

(10) Patent No.: US 7,890,638 B2
(45) Date of Patent: Feb. 15, 2011

(54) COMMUNICATION BETWEEN A REAL WORLD ENVIRONMENT AND A VIRTUAL WORLD ENVIRONMENT

(75) Inventors: David S. Benco, Winfield, IL (US); Anne Y. Lee, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 648 days.

(21) Appl. No.: 11/864,981

(22) Filed: Sep. 29, 2007

(65) Prior Publication Data
US 2009/0089439 A1  Apr. 2, 2009

(51) Int. Cl.
G06F 15/16 (2006.01)
(52) U.S. Cl. ......................... 709/228; 709/227; 709/246
(58) Field of Classification Search ......... 709/227–228, 709/246
See application file for complete search history.

(56) References Cited
U.S. PATENT DOCUMENTS

2001/0046228 A1*  11/2001  Tahtinen et al. ............. 370/389
2003/0177187 A1*  9/2003  Levine et al. ................ 709/205
2007/0073582 A1*  3/2007  Jung et al. .................... 705/14
2007/0203828 A1*  8/2007  Jung et al. .................... 705/38

* cited by examiner

Primary Examiner—Salad Abdullahi
(74) Attorney, Agent, or Firm—Duft Bornsen & Fishman LLP

(57) ABSTRACT

Gateway systems and methods are disclosed for allowing for communication between a real world environment and a virtual world environment. A gateway system in one embodiment is implemented between the virtual world environment and the real world environment. For a session being initiated from a real world user to a virtual world user, the gateway system receives a signaling message from the real world user to initiate the session with the virtual world user, and processes the signaling message to identify a virtual world identifier assigned to the virtual world user. The gateway system converts the signaling message to a communication request message in a protocol used in the virtual world environment, and transmits the communication request message to the virtual world user to establish the session. When the session is established, the virtual world user and the real world user may communicate via voice and/or data.

20 Claims, 7 Drawing Sheets

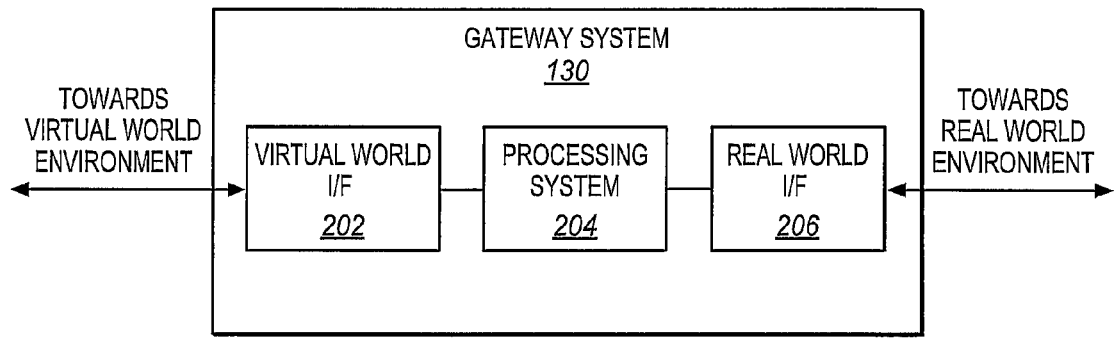
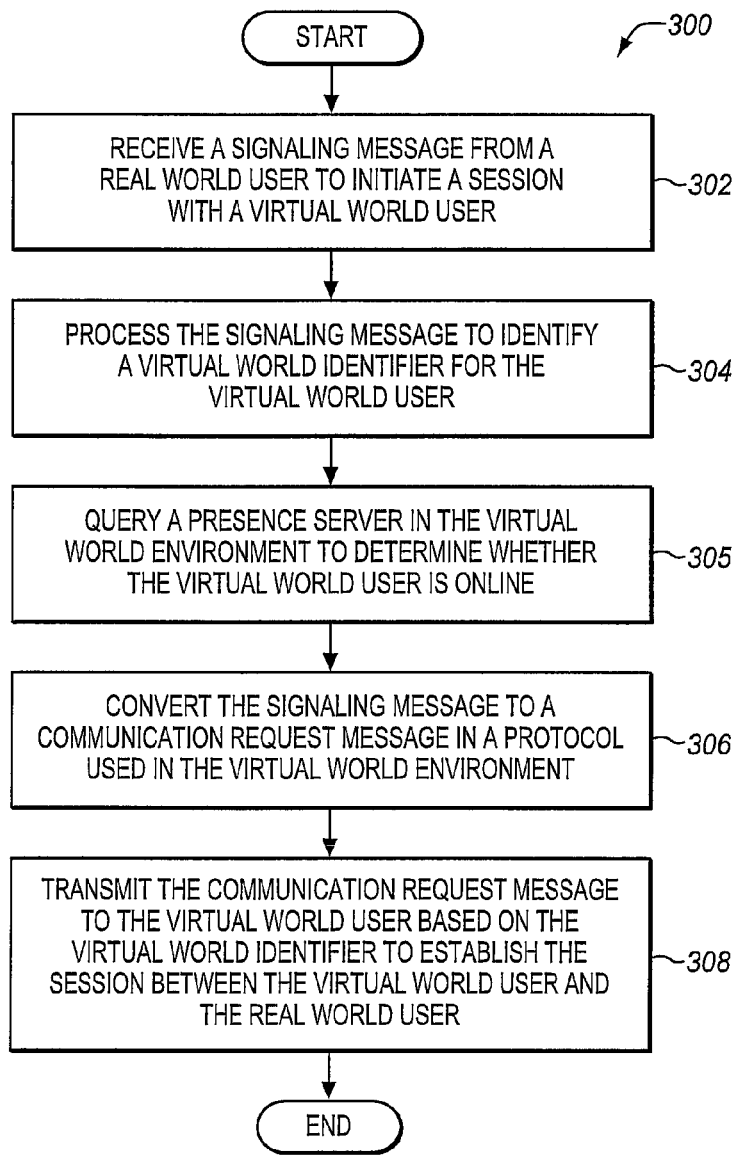

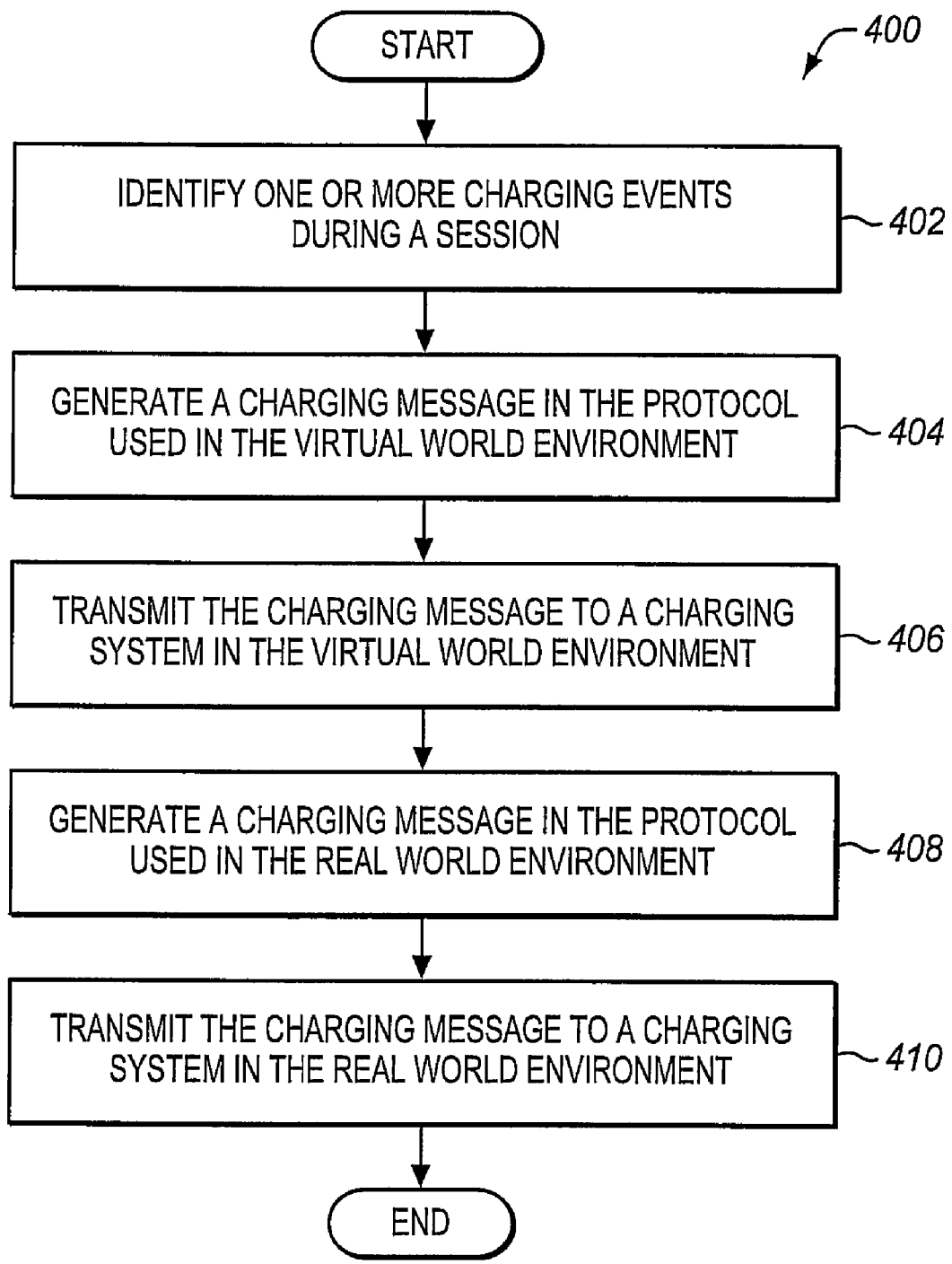

COMMUNICATION BETWEEN A REAL WORLD ENVIRONMENT AND A VIRTUAL WORLD ENVIRONMENT

BACKGROUND OF THE INVENTION

1. Field of the Invention

The invention is related to the field of communication networks and, in particular, to providing for communication between a real world environment and a virtual world environment.

2. Statement of the Problem

A virtual world is a computer-based simulated environment that users may inhibit and interact with one another. One example of a virtual world is Second Life, which may be accessed at "www.secondlife.com". To access a virtual world, a user (also referred to as a "resident") downloads a client program to his/her PC. The client program communicates with one or more virtual world servers to access the virtual world. The user establishes an account in the virtual world and defines an avatar which is a graphical representation of the user in the virtual world. A basic avatar is human in appearance, but avatars may be of either sex, have a wide range of physical attributes, and may be clothed or otherwise customized to produce a wide variety of humanoid and other forms. Through their avatar, a user may explore the virtual world, meet other residents, socialize, participate in individual and group activities, and trade items (virtual property) and services from one another.

The main method of communication in a virtual world is text based. There are two main methods of text-based communication: local chat and global instant messaging (IM). Chatting is typically used for public localized conversations between two or more avatars. IM is used for private conversations, either between two avatars, or between the members of a group. Some virtual worlds now allow for real-time voice communication between the avatars in the virtual world. For voice communication, the client program provides an audio interface for the user. The user has a head set or some other device that works in conjunction with the audio interface of the client program to capture the voice of the user and provide the voice to another party in the virtual world. Similarly, the audio interface provides the voice of the other party in the virtual world to the user through a speaker in the head set.

One problem with present virtual worlds is that they only allow for communication between users of the virtual world. As virtual worlds become more popular and the features become more usable, it may be desirable to merge some features of the virtual world with the real world (i.e., the world in which we live). For example, it may be desirable to allow a virtual world user, through his/her avatar, to place a call to a real world user. Unfortunately, the virtual worlds and the real worlds are not presently merged to allow for such communication.

SUMMARY OF THE SOLUTION

Embodiments of the invention solve the above and other related problems with a gateway system and associated methods that provide functionalities to allow a real world user to initiate an interactive session with a virtual world user, and vice-versa. A virtual world user that is logged into a virtual world may place a call or otherwise communicate with a real world user through the virtual world (i.e., without having to place a regular telephone call). Also, a real world user may place a call or otherwise communicate with a virtual world user through the virtual world. The gateway system advantageously provides more communication options to a virtual world user instead of just communicating with other virtual world users.

One embodiment of the invention comprises a gateway system that is implemented between a virtual world environment and a real world environment. For a session being initiated from a real world user to a virtual world user, the gateway system receives a signaling message from the real world user to initiate the session with the virtual world user. The gateway system processes the signaling message to identify a virtual world identifier, such as an IP address or a user ID, assigned to the virtual world user in the virtual world environment. The gateway system converts the signaling message to a communication request message in a protocol used in the virtual world environment. The gateway system then transmits the communication request message to the virtual world user based on the virtual world identifier to establish the session between the virtual world user and the real world user. When the session is subsequently established, the virtual world user and the real world user may communicate via voice and/or data.

For a session being initiated from a virtual world user to a real world user, the gateway system receives a communication request message from the virtual world user. The gateway system processes the communication request message to identify the directory number for the real world user. The gateway system converts the communication request message to a signaling message in a protocol used in a communication network of the real world user. The gateway system then transmits the signaling message to the communication network of the real world user to establish the session between the virtual world user and the real world user. When the session is subsequently established, the virtual world user and the real world user may communicate via voice and/or data.

The invention may include other exemplary embodiments described below.

DESCRIPTION OF THE DRAWINGS

The same reference number represents the same element or same type of element on all drawings.

FIG. 2 is a block diagram illustrating a gateway system in an exemplary embodiment of the invention.

FIG. 3 is a flow chart illustrating a method of operating a gateway system to establish a session from a real world environment to a virtual world environment in an exemplary embodiment of the invention.

FIG. 4 is a flow chart illustrating a method of charging for a session in an exemplary embodiment of the invention.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
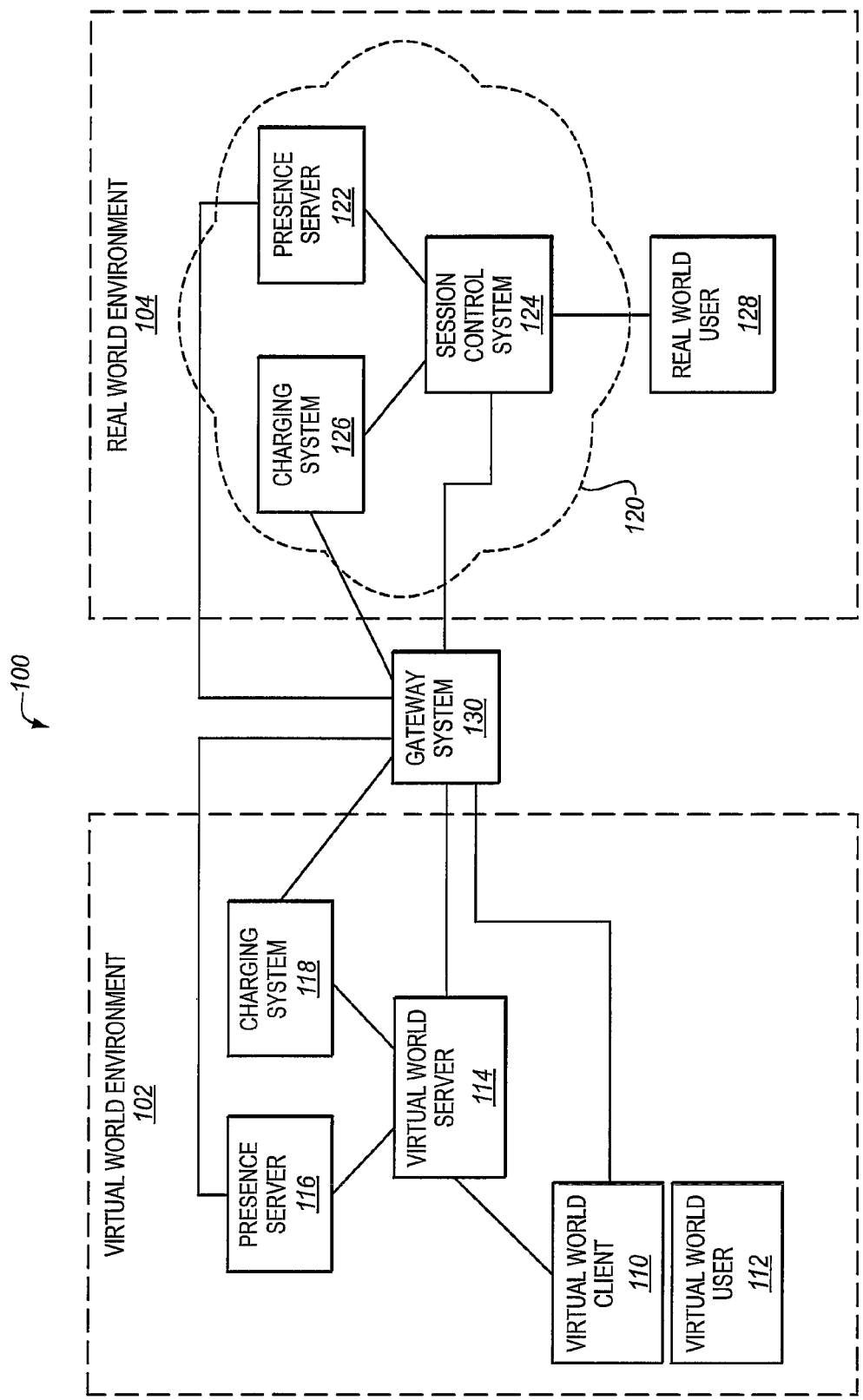
FIG. 1 illustrates a communication network in an exemplary embodiment of the invention.

FIG. 1 illustrates a communication network 100 in an exemplary embodiment of the invention. Communication network 100 includes a virtual world environment 102 and a real world environment 104. Virtual world environment 102 represents the systems, devices, and/or networks used to provide a virtual world to one or more virtual world users. Real world environment 104 represents the systems, devices, and/or networks used to provide voice and data communication in the real world. In one embodiment, real world environment 104 may include an IMS network adapted to provide multimedia communications to users.

Virtual world environment 102 includes a virtual world client 110 being operated by a virtual world user 112, one or more virtual world servers 114, a presence server 116, and a charging system 118. Virtual world client 110 comprises any instructions, application, or function adapted to communicate with one or more virtual world servers to interface a user with a virtual world. Virtual world client 110 may be executed on a PC, on a mobile device, or another type of processing device. Virtual world user 112 is a human being that is interacting with virtual world client 110 to access the virtual world. Virtual world user 112 may use a variety of interfaces provided by virtual world client 110 to access, navigate, and communicate in the virtual world. For instance, virtual world user 112 may use a keyboard, a mouse, a joy stick, etc, to navigate the virtual world through virtual world client 110. Also, virtual world user 112 may use a head set or another type of audio system to communicate through the virtual world.

Virtual world server 114 comprises any system, server, or function adapted to provide a simulated virtual world to a plurality of users. Presence server 116 comprises any system, server, or function adapted to monitor the status or presence of users in the virtual world. For example, presence server 116 may monitor which virtual world users are online or logged in. Charging system 118 comprises any system, server, or function adapted to charge for events in the virtual world. Charging function 118 may charge in real currency, such as U.S. dollars, or may charge in a virtual world currency that is exchanged in the virtual world.

Real world environment 104 includes a communication network 120. Communication network 120 comprises any type of network that provides voice and/or data communications, such as an IMS network, a cellular network, a PSTN, etc. Communication network 120 is adapted to provide service to a real world user 128, who may communicate through a wireline or mobile communication device. Communication network 120 includes a presence server 122, a session control system 124, and a charging system 126. Presence server 122 comprises any system, server, or function adapted to monitor the status or presence of users in communication network 120. For example, presence server 122 may monitor the communication capabilities of a user, such as voice, IM, email, text, etc. Session control system 124 comprises any system, server, or function adapted to set up, maintain, and tear down sessions in communication network 120. Examples of session control system 124 include a Serving-Call Session Control Function (S-CSCF) in an IMS network, a Mobile Switching Center (MSC) in a cellular network, or a switch in a PSTN. Charging system 126 comprises any system, server, or function adapted to charge for sessions in communication network 120.

Communication network 100 further includes a gateway system 130 connected between virtual world environment 102 and real world environment 104. Gateway system 130 comprises any system, server, or function adapted to interwork signaling and/or bearer communications for a session between virtual world environment 102 and real world environment 104. Gateway system 130 may be connected between virtual world server 114 and session control system 124, or between other elements or nodes in the environments.

FIG. 2 is a block diagram illustrating gateway system 130 in an exemplary embodiment of the invention. Gateway system 130 includes a virtual world interface 202, a processing system 204, and a real world interface 206. Virtual world interface 202 comprises any device, component, or function adapted to communicate with nodes or elements in virtual world environment 102, such as by communicating with virtual world server 114. Virtual world interface 202 may use one or more protocols supported in virtual world environment 102.

Real world interface 206 comprises any device, component, or function adapted to communicate with nodes or elements in real world environment 104, such as by communicating with session control system 124. Real world interface 206 may use one or more protocols supported in real world environment 104. For example, if communication network 120 comprises an IMS network, then the protocol used for signaling may comprise Session Initiation Protocol (SIP) which real world interface 206 is adapted to support. In another example, if communication network 120 comprises a CDMA network, then the protocol used for signaling may comprise Integrated Services Digital Network User Part (ISUP) which real world interface 206 is adapted to support.

Processing system 204 is adapted to interwork signaling and/or bearer communications for a session between virtual world environment 102 and real world environment 104. Processing system 204 may be implemented as software, hardware, or a combination of hardware and software. In a software implementation, processing system 204 may execute instructions that are stored on storage media. Some examples of instructions are software, program code, and firmware. Some examples of storage media are memory devices, tape, disks, integrated circuits, and servers. The instructions are operational when executed by processing system 204 to direct processing system 204 to operate in accordance with the invention. The term "processing system" refers to a single processing device or a group of inter-operational processing devices. Some examples of processors are computers, integrated circuits, and logic circuitry.

In FIG. 1, virtual world user 112 logs on to the virtual world through virtual world client 110. Virtual world user 112 is assigned a network address, and virtual world server 114 exchanges content with virtual world client 110 so that virtual world user 112 can "enter" the virtual world. Virtual world user 112 may then navigate through the virtual world, communicate with other virtual world users, and perform other functions in the virtual world.

Assume for example that real world user 128 wants to initiate an interactive (bi-directional) session with virtual world user 112. Real world user 128 is not logged into the virtual world and thus is not able to communicate with virtual world user 112 through the virtual world. Instead, real world user 128 wants to communicate with virtual world user 112 through communication network 120. To initiate the session, real world user 128 enters a directory number, a user ID, or some other information into his/her communication device (not shown in FIG. 1). The communication device then generates a signaling message in the appropriate signaling protocol (e.g., SIP) of communication network 120, and transmits the signaling message to session control system 124. Session control system 124 processes the signaling message and determines that the session is being initiated with a virtual world user 112. Thus, session control system 124 routes the signaling message to gateway system 130.

FIG. 3 is a flow chart illustrating a method 300 of operating gateway system 130 to establish a session from real world environment 104 to virtual world environment 102 in an exemplary embodiment of the invention. The steps of method 300 will be described with reference to communication network 100 and gateway system 130 as shown in FIGS. 1-2. The steps of the flow chart in FIG. 3 are not all inclusive and may include other steps not shown.

In step 302 of method 300, real world interface 206 receives the signaling message from real world user 128. In step 304, processing system 204 processes the signaling message to identify a virtual world identifier for virtual world user 112. The virtual world identifier comprises any number, code, address, etc, used to access virtual world user 112 through the virtual world. As an example, assume that the signaling message includes a directory number for virtual world user 112, and processing system 204 determines that the directory number belongs to a virtual world user. Processing system 204 may then access virtual world server 114 to identify the virtual world identifier, such as an IP address or a user ID, for virtual world server 112. Processing system 204 may alternatively access an internal or external database (not shown) that maps directory numbers to virtual world identifiers for virtual world users.

Processing system 204 may optionally query presence server 116 in virtual world environment 102 to determine whether virtual world user 112 is registered in or logged into virtual world environment 102 in step 305. Presence server 116 monitors which users are logged into the virtual world. Thus, presence server 116 is able to determine whether virtual world user 112 is presently logged into the virtual world and available to communicate with real world user 128 responsive to the query from processing system 204. Presence server 116 then transmits a response to processing system 204 indicating the present status of virtual world user 112.

In step 306, processing system 204 converts the signaling message to a communication request message in a protocol used in virtual world environment 102. As an example, if the signaling message comprises a SIP INVITE message, then processing system 204 converts the SIP INVITE message to a communication request message in the protocol used in virtual world environment 102. The communication request message is used to establish a communication leg with virtual world user 112 in virtual world environment 102.

In converting the signaling message to a communication request message, processing system 204 may modify or change certain information in the signaling message based on rules or policies defined in gateway system 130. For example, processing system 204 may modify caller ID information in the signaling message. To do so, processing system 204 first identifies the caller ID information for real world user 128 that is included in the signaling message. Processing system 204 then modifies the caller ID information according to the rules or policies, such as to mask or change the identity of real world user 128.

In step 308, virtual world interface 202 transmits the communication request message to the virtual world user 112 based on the virtual world identifier to establish the session between virtual world user 112 and real world user 128. Transmitting the communication request message to the virtual world user 112 refers to transmitting the communication request message to a virtual world identifier for receipt by virtual world client 110 so that virtual world client 110 may establish the session. Virtual world client 110 may exchange further messages with gateway system 130 to establish the session. Likewise, the communication device of real world user 128 may exchange further signaling messages with gateway system 130 to establish the session.

When the session is subsequently established, virtual world user 112 and real world user 128 may communicate via voice and/or data. Real world user 128 uses his/her communication device to converse with virtual world user 112 through communication network 120. Virtual world user 112 uses interfaces provided by virtual world client 110 to converse with real world user 128 through the virtual world. For example, virtual world client 110 may provide an audio interface where virtual world user 112 plugs in his/her headset. Through the headset, virtual world client 110 is able to speak to real world user 128 and hear the voice conversation of real world user 128. From the standpoint of virtual world user 112, the conversation is through the virtual world much in the same way that virtual world user 112 is able to communicate with other virtual world users. However, virtual world user 112 is actually conversing with real world user 128 through the virtual world functionalities as enabled by gateway system 130.

Processing system 204 may modify or change the voice and/or data of the session based on rules or policies defined in gateway system 130. For example, processing system 204 may modify the voice for one or both of virtual world user 112 and real world user 128. In the virtual world, virtual world user 112 may have defined a particular voice pattern for his/her avatar, such as a foreign accent, a deep voice, etc. Virtual world user 112 may want the voice defined for their avatar to be used when communicating with real world user 128. To modify the voice, processing system 204 first identifies the voice traffic from virtual world user 112. Processing system 204 then modifies the voice traffic to sound like the avatar of virtual world user 112. Processing system 204 may query virtual world server 114 to access a voice file that is defined for the avatar of virtual world user 112, and modify the voice traffic based on the voice file. When real world user 128 subsequently hears the voice conversation, the spoken words of virtual world user 112 will sound like the avatar of virtual world user 112 in the virtual world instead of the actual voice virtual world user 112.

During the session, processing system 204 may perform charging functions in order to charge virtual world user 112 and/or real world user 128 for the session. FIG. 4 is a flow chart illustrating a method 400 of charging for a session in an exemplary embodiment of the invention. The steps of method 400 will be described with reference to communication network 100 and gateway system 130 as shown in FIGS. 1-2. The steps of the flow chart in FIG. 4 are not all inclusive and may include other steps not shown.

In step 402, processing system 204 identifies one or more charging events during the session. A charging event may be the initiation of the session, the end of the session, or some other event. In step 404, processing system 204 generates a charging message in the protocol used in virtual world environment 102 responsive to a charging event. In step 406, processing system 204 transmits the charging message to charging system 118 in virtual world environment 102. Charging system 118 may then charge virtual world user 112 accordingly for the session. As previously stated, the charge in virtual world environment 102 may be real currency, such as U.S. dollars, or may be a virtual world currency that is exchanged in the virtual world.

In a similar manner, processing system 204 generates a charging message in the protocol used in real world environment 104 responsive to the same or different charging event in step 408. In step 410, processing system 204 transmits the charging message to charging system 126 in real world environment 104.

The following describes an example of charging in real world environment 104. Assume that communication network 120 comprises an IMS network. Gateway system 130 may be programmed to generate offline (or online) charging messages for the IMS network much like an S-CSCF or an application server generates charging messages. When the session is initiated, processing system 204 may generate a Diameter Accounting Request (ACR) [start] message, and transmit the ACR[start] message to charging system 126. Charging system 126 may comprise a Charging Data Function (CDF) in such an example. Periodically during the session, processing system 204 may generate ACR[interim] messages, and transmit the ACR[interim] messages to charging system 126. At the end of the session, processing system 204 may generate an ACR[stop] message, and transmit the ACR[stop] message to charging system 126. Gateway system 130 thus acts like other IMS nodes to generate charging information for the session.

Assume for another example that virtual world user 112 wants to initiate an interactive (bidirectional) session with real world user 128. Again, real world user 128 is not logged into the virtual world. To initiate the session, virtual world user 112 enters a directory number for real world user 128 into the appropriate interface provided by virtual world client 110. For example, virtual world client 110 may display a dial keypad through which virtual world user 112 may enter a number for real world user 128. Alternatively, the avatar of virtual world user 112 may have a phone in the virtual world, and virtual world client 110 allows virtual world user 112 to move his/her avatar in such a manner to dial the number of the real world user 128 on the avatar's phone. Responsive to the dialing by virtual world user 112, virtual world client 110 generates a communication request message in the appropriate protocol in virtual world environment 102, and transmits the communication request message to gateway system 130.

Figure 5:
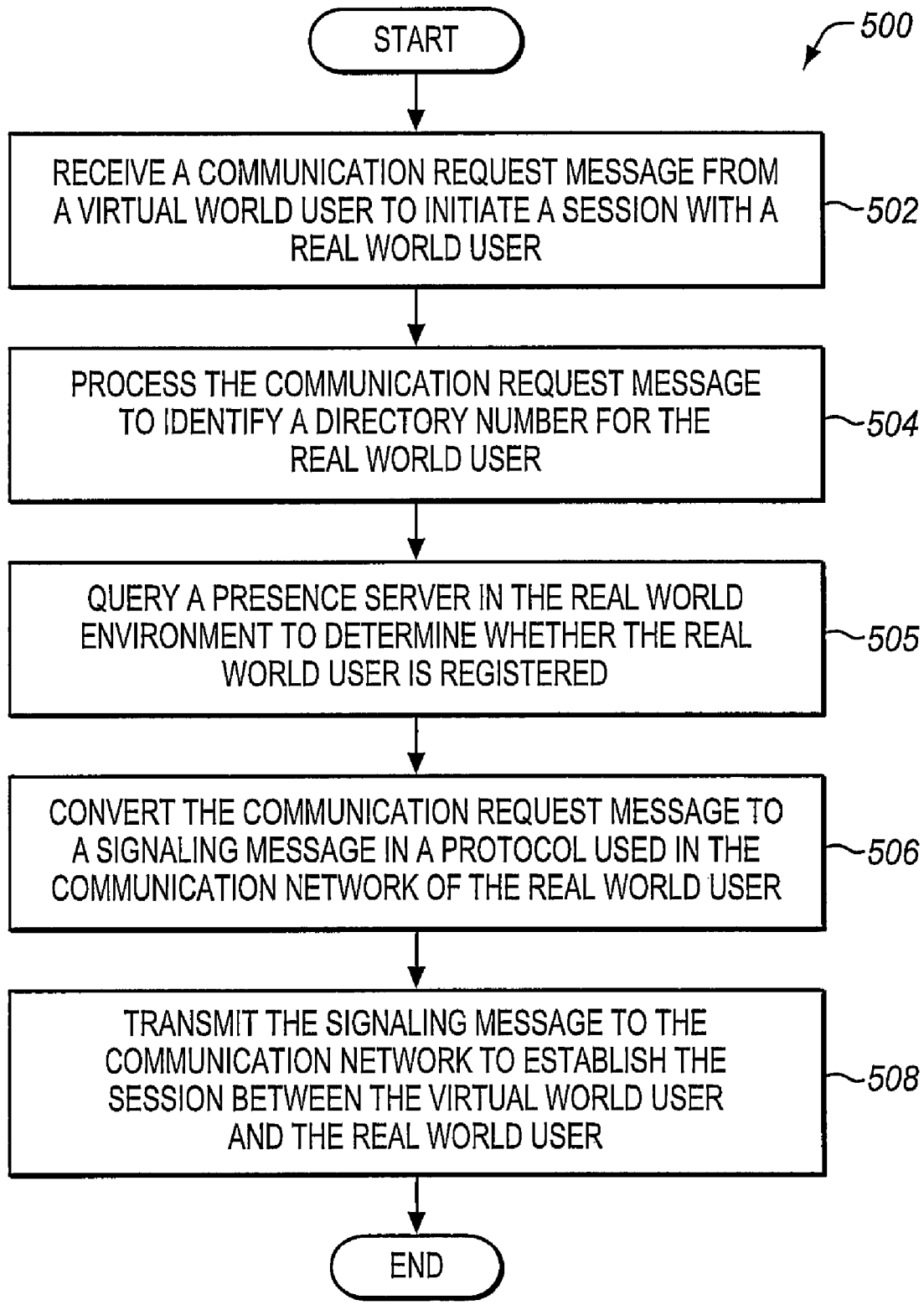
FIG. 5 is a flow chart illustrating a method of operating a gateway system to establish a session from a virtual world environment to a real world environment in an exemplary embodiment of the invention.

FIG. 5 is a flow chart illustrating a method 500 of operating gateway system 130 to establish a session from virtual world environment 102 to real world environment 104 in an exemplary embodiment of the invention. The steps of method 500 will be described with reference to communication network 100 and gateway system 130 as shown in FIGS. 1-2. The steps of the flow chart in FIG. 5 are not all inclusive and may include other steps not shown.

In step 502 of method 500, virtual world interface 202 receives the communication request message from virtual world user 112. In step 504, processing system 204 processes the communication request message to identify the directory number for real world user 128. Processing system 204 may optionally query presence server 122 in real world environment 104 to determine whether real world user 128 is registered with communication network 120 and is available for communication in step 505. Presence server 122 monitors the presence of users on communication network 120, such as the communication capabilities and the status of the users. Thus, presence server 122 is able to determine whether real world user 128 is presently registered with communication network 120 and available to communicate with virtual world user 112 responsive to the query from processing system 204. Presence server 122 then transmits a response to processing system 204 indicating the present status of real world user 128.

In step 506, processing system 204 converts the communication request message to a signaling message in a protocol used in communication network 120. As an example, if communication network 120 uses SIP, then processing system 204 may convert the communication request message to a SIP INVITE message. The signaling message is used to establish a communication leg with real world user 128 in real world environment 104. As previously described, processing system 204 may modify or change certain information in the communication request message based on rules or policies defined in gateway system 130, such as modifying caller ID information.

In step 508, real world interface 206 transmits the signaling message to the session control system 124 in communication network 120 to establish the session between virtual world user 112 and real world user 128. Session control system 124 may exchange further signaling messages with gateway system 130 to establish the session. Likewise, virtual world client 110 may then exchange further messages with gateway system 130 to establish the session. When the session is subsequently established, virtual world user 112 and real world user 128 may communicate via voice and/or data. Processing system 204 may also perform charging functions in order to charge virtual world user 112 and/or real world user 128 for the session as described in FIG. 4.

EXAMPLE

Figure 6:
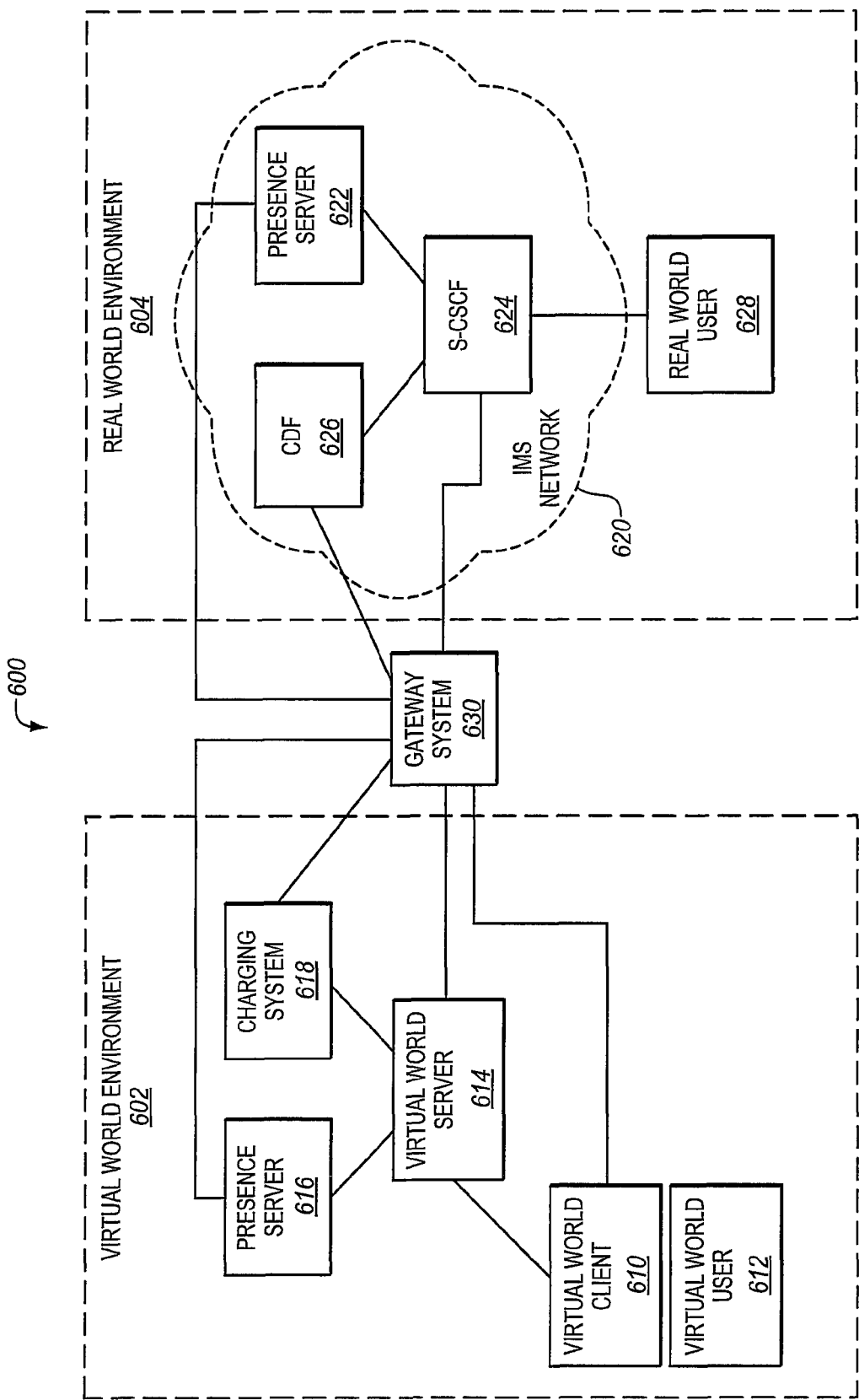
FIG. 6 illustrates another communication network in an exemplary embodiment of the invention.
Figure 7:
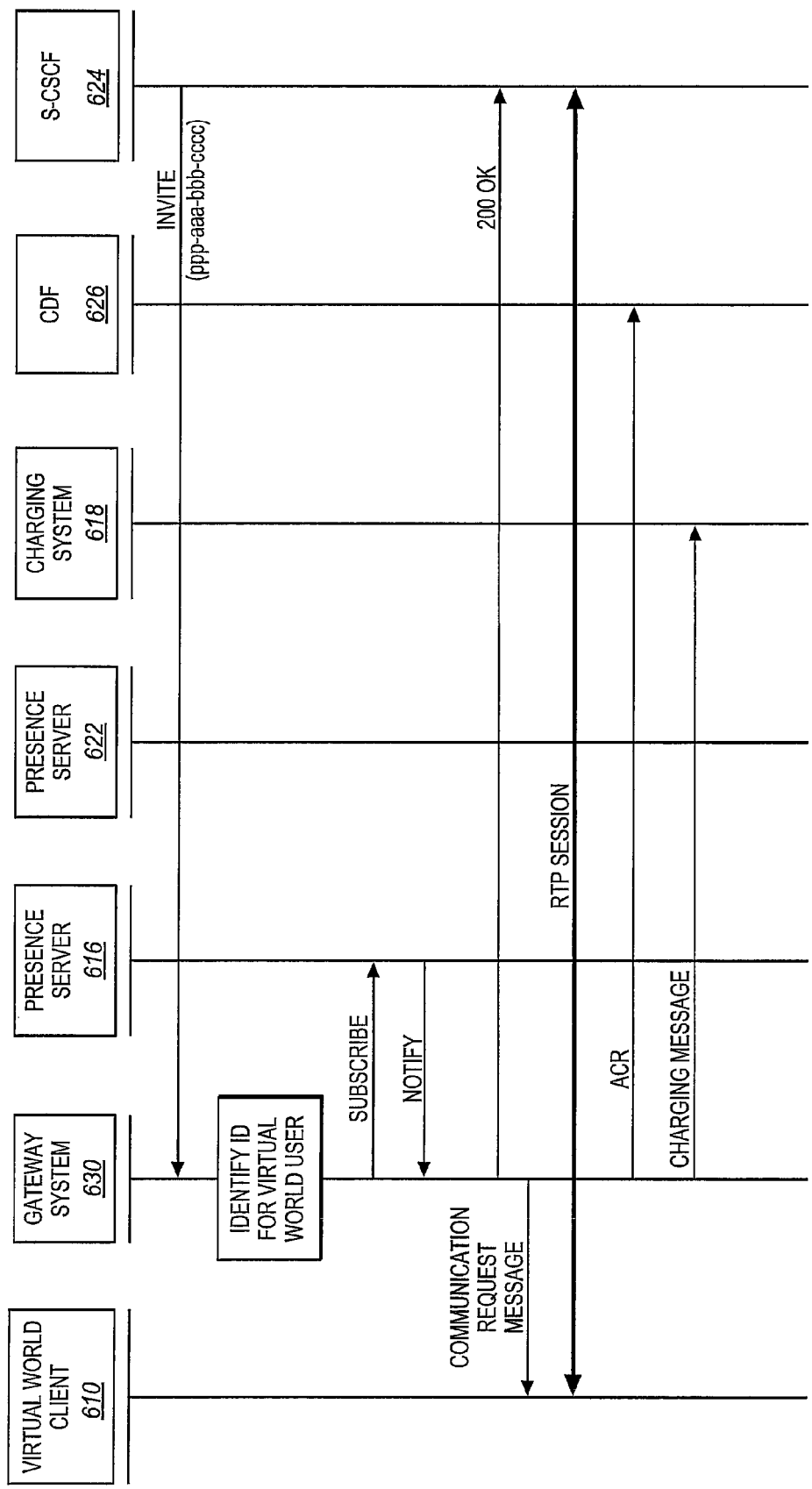
FIG. 7 is a message diagram illustrating the establishment of a session from a real world environment to a virtual world environment in an exemplary embodiment of the invention.
Figure 8:
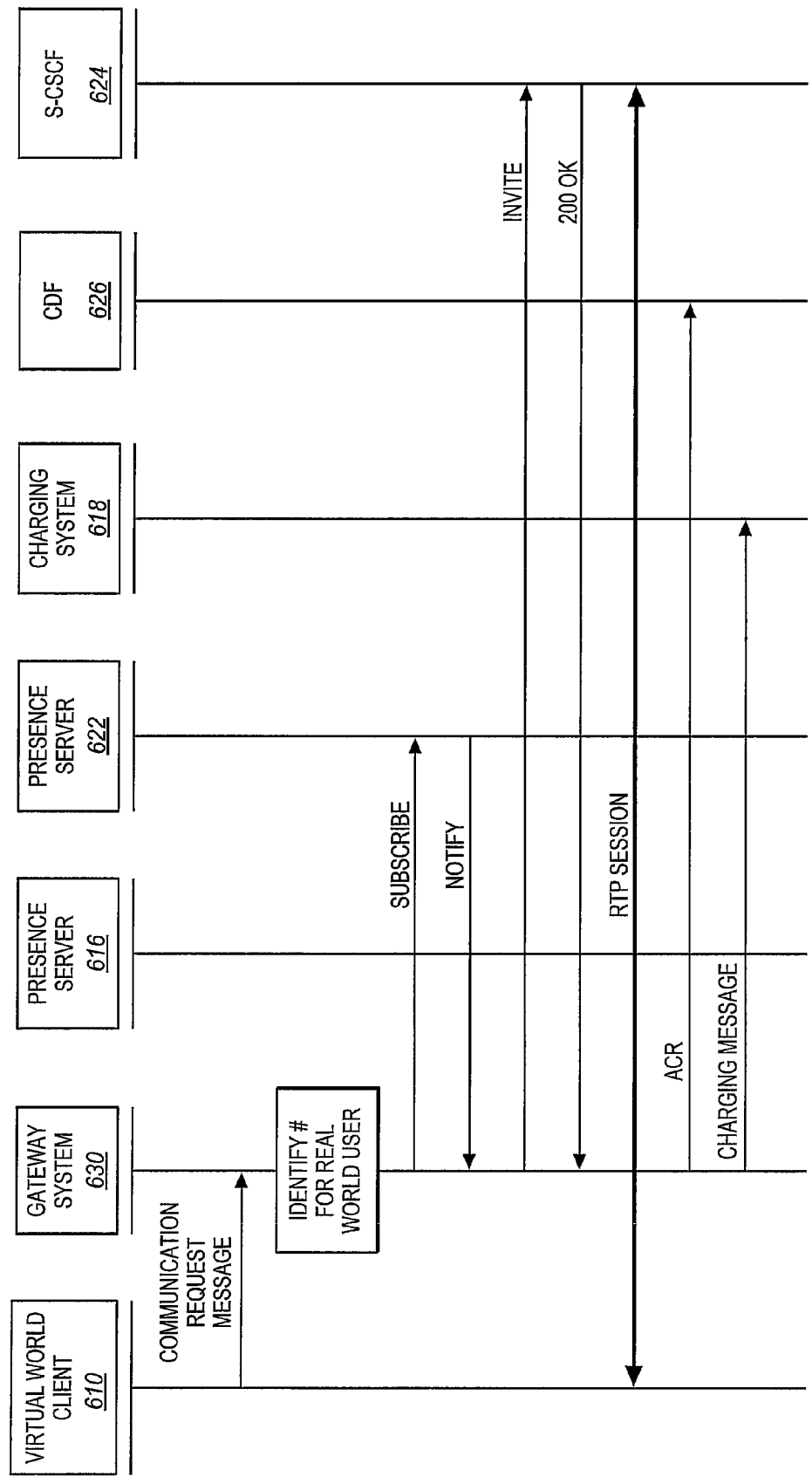
FIG. 8 is a message diagram illustrating the establishment of a session from a virtual world environment to a real world environment in an exemplary embodiment of the invention.

FIGS. 6-8 illustrate an example of establishing sessions between a virtual world environment and a real world environment. FIG. 6 illustrates communication network 600 in an exemplary embodiment of the invention. Communication network 600 includes a virtual world environment 602 and a real world environment 604 much like in FIG. 1. Virtual world environment 602 includes a virtual world client 610 being operated by a virtual world user 612, one or more virtual world servers 614, a presence server 616, and a charging system 618. Real world environment 604 includes an IMS network 620. IMS network 620 includes a presence server 622, an S-CSCF 624, and a Charging Data Function (CDF) 626. Communication network 600 further includes a gateway system 630 connected between virtual world environment 602 and real world environment 604. Gateway system 630 may be connected between virtual world server 614 and S-CSCF 624, or between other elements or nodes in the environments.

FIG. 7 is a message diagram illustrating the establishment of a session from real world environment 604 to virtual world environment 602 in an exemplary embodiment of the invention. The message diagram illustrates SIP and Diameter messaging used within communication network 600. Assume that real world user 628 of IMS network 620 wants to initiate a session with virtual world user 612. To initiate the session, real world user 628 enters a number for virtual world user 612 (ppp-aaa-bbb-cccc) into an IMS device (not shown in FIG. 6) responsive to which the IMS device generates a SIP INVITE message and transmits the INVITE message to S-CSCF 624. S-CSCF 624 processes the INVITE message to determine that the destination of the session is a virtual world user 612. Responsive to determining that the destination of the session is a virtual world user 612, S-CSCF 624 forwards the INVITE message to gateway system 630.

Gateway system 630 processes the INVITE message to identify a virtual world identifier for virtual world user 612. For example, gateway system 630 may hash the dial string entered by real world user 628 to identify the virtual world identifier for virtual world user 612. Gateway system 630 then transmits a SIP SUBSCRIBE message to presence server 616 to determine whether virtual world user 612 is presently logged into the virtual world. Presence server 616 determines whether virtual world user 612 is presently logged into the virtual world, and transmits a SIP NOTIFY message back to gateway system 630 indicating the presence of virtual world user 612.

If virtual world user 612 is not logged on, then gateway system 630 transmits a SIP 404 message to S-CSCF 624 indicating that virtual world user 612 was not found. If virtual world user 612 is logged on, then gateway system 630 transmits a SIP 200 OK message to S-CSCF 624.

Gateway system 630 then converts the SIP INVITE message into a communication request message in a protocol used in virtual world environment 602. In converting the INVITE message, gateway system 630 processes any rules or policies to determine how to convert the INVITE message. For instance, rules may be defined that caller ID information is suppressed from calls initiated from IMS network 620. Gateway system 630 then transmits the communication request message to virtual world client 610. Virtual world client 610 and S-CSCF 624 may then exchange further messages to establish an RTP session. Virtual world client 610 may have a direct communication path with gateway system 630, or may have a communication path through virtual world server 614.

When the session is established, virtual world user 612 and real world user 628 may communicate via voice and/or data. Real world user 628 uses his/her communication device to converse with virtual world user 612 through IMS network 620. Virtual world user 612 uses interfaces provided by virtual world client 610 to converse with real world user 628 through the virtual world. Thus, virtual world user 612 may use a headset on a PC that is running the virtual world client 610 to converse with real world user 628 through the virtual world. From the standpoint of virtual world user 612, the conversation is through the virtual world much in the same way that virtual world user 612 is able to communicate with other virtual world users.

During the session, gateway system 630 identifies one or more charging events. To provide charging for IMS network 620, gateway system 630 generates Diameter Accounting Request (ACR) messages, and transmits the ACR[start/interim/stop] messages to CDF 626. To provide charging for the virtual world, gateway system 630 generates a charging message in the protocol used in virtual world environment 602, and transmits the charging messages to charging system 618. CDF 626 and charging system 618 may then apply the appropriate charging for the session.

FIG. 8 is a message diagram illustrating the establishment of a session from virtual world environment 602 to real world environment 604 in an exemplary embodiment of the invention. Assume that virtual world user 612 wants to initiate a session with real world user 628. To initiate the session, virtual world user 612 enters a directory number for real world user 628 through the appropriate interface provided by virtual world client 610. Virtual world client 610 then generates a communication request message and transmits the communication request message to gateway system 630.

Gateway system 630 processes the communication request message to identify the directory number for the destination for the session. Gateway system 630 then transmits a SIP SUBSCRIBE message to presence server 622 to determine whether real world user 628 is presently registered with IMS network 620. Presence server 622 determines whether real world user 628 is presently registered, and transmits a SIP NOTIFY message back to gateway system 630 indicating the presence of real world user 628.

If real world user 628 is not registered with IMS network 620, then gateway system 630 transmits a response message to virtual world client 610 indicating that real world user 628 is not available for a session. If real world user 628 is registered, then gateway system 630 converts the communication request message into a SIP INVITE message. In converting the communication request message, gateway system 630 processes any rules or policies to determine how to convert the communication request message. Gateway system 630 then transmits the INVITE message to S-CSCF 624. S-CSCF 624 responds to gateway system 630 with a SIP 200 OK message. Virtual world client 610 and S-CSCF 624 may then exchange further messages to establish an RTP session. When the session is established, virtual world user 612 and real world user 628 may communicate via voice and/or data.

During the session, gateway system 630 identifies one or more charging events. To provide charging for IMS network 620, gateway system 630 generates Diameter ACR messages, and transmits the ACR[start/interim/stop] messages to CDF 626. To provide charging for the virtual world, gateway system 630 generates a charging message in the protocol used in virtual world environment 602, and transmits the charging messages to charging system 618. CDF 626 and charging system 618 may then apply the appropriate charging for the session.

Although specific embodiments were described herein, the scope of the invention is not limited to those specific embodiments. The scope of the invention is defined by the following claims and any equivalents thereof.

We claim:

1. A gateway system adapted to establish interactive sessions between a real world environment and a virtual world environment, the gateway system comprising:
   a real world interface adapted to receive a signaling message from a communication network of a real world user in the real world environment to initiate an interactive session with a virtual world user in the virtual world environment, wherein the real world user is not logged into the virtual world environment;
   a processing system adapted to process the signaling message to identify a virtual world identifier assigned to the virtual world user in the virtual world environment, and to convert the signaling message to a communication request message in a protocol used in the virtual world environment; and
   a virtual world interface adapted to transmit the communication request message to the virtual world user based on the virtual world identifier to establish the session between the virtual world user and the real world user;
   wherein a conversation for the session is through the virtual world environment from the standpoint of the virtual world user and is through the real world environment from the standpoint of the real world user.

2. The gateway system of claim 1 wherein the processing system is further adapted to:
query a presence server in the virtual world environment to determine whether the virtual world user is registered in the virtual world environment.

3. The gateway system of claim 1 wherein the processing system is further adapted to:
identify charging events during the session;
generate a first charging message in the protocol used in the virtual world environment responsive to a charging event; and
transmit the first charging message to a charging system in the virtual world environment.

4. The gateway system of claim 3 wherein the processing system is further adapted to:
generate a second charging message in the protocol used in the real world environment responsive to a charging event; and
transmit the second charging message to a charging system in the real world environment.

5. The gateway system of claim 1 wherein the processing system is further adapted to:
identify voice traffic for the session from the virtual world user; and
modify the voice traffic to sound like an avatar that represents the virtual world user in the virtual world environment.

6. The gateway system of claim 1 wherein the processing system is further adapted to:
identify caller ID information for the real world user; and
modify the caller ID information to mask the identity of the real world user.

7. The gateway system of claim 1 wherein:
the virtual world interface is further adapted to receive another communication request message from the virtual world user in the virtual world environment to initiate another interactive session with the real world user in the real world environment;
the processing system is further adapted to process the other communication request message to identify a directory number for the real world user, and to convert the other communication request message to another signaling message in a protocol used in a communication network of the real world user; and
the real world interface is further adapted to transmit the other signaling message to the communication network of the real world user to establish the session between the virtual world user and the real world user.

8. The gateway system of claim 7 wherein the processing system is further adapted to:
query a presence server in the real world environment to determine whether the real world user is registered with the communication network.

9. A method of communicating between a real world environment and a virtual world environment, the method comprising:
receiving a signaling message from a communication network of a real world user in the real world environment to initiate an interactive session with a virtual world user in the virtual world environment, wherein the real world user is not logged into the virtual world environment;
processing the signaling message to identify a virtual world identifier assigned to the virtual world user in the virtual world environment;
converting the signaling message to a communication request message in a protocol used in the virtual world environment; and
transmitting the communication request message to the virtual world user based on the virtual world identifier to establish the session between the virtual world user and the real world user;
wherein a conversation for the session is through the virtual world environment from the standpoint of the virtual world user and is through the real world environment from the standpoint of the real world user.

10. The method of claim 9 further comprising:
querying a presence server in the virtual world environment to determine whether the virtual world user is registered in the virtual world environment.

11. The method of claim 9 further comprising:
identifying charging events during the session;
generating a first charging message in the protocol used in the real world environment responsive to a charging event; and
transmitting the first charging message to a charging system in the real world environment.

12. The method of claim 11 further comprising:
generating a second charging message in the protocol used in the virtual world environment responsive to a charging event; and
transmitting the second charging message to a charging system in the virtual world environment.

13. The method of claim 9 further comprising:
identifying voice traffic for the session from the virtual world user; and
modifying the voice traffic to sound like an avatar that represents the virtual world user in the virtual world environment.

14. The method of claim 9 further comprising:
identifying caller ID information for the real world user; and
modifying the caller ID information to mask the identity of the real world user.

15. A method of communicating between a virtual world environment and a real world environment, the method comprising:
receiving a communication request message from a virtual world user in the virtual world environment to initiate an interactive session with a real world user in the real world environment, wherein the real world user is not logged into the virtual world environment;
processing the communication request message to identify a directory number for the real world user;
converting the communication request message to a signaling message in a protocol used in a communication network of the real world user; and
transmitting the signaling message to the communication network of the real world user to establish the session between the virtual world user and the real world user;
wherein a conversation for the session is through the virtual world environment from the standpoint of the virtual world user and is through the real world environment from the standpoint of the real world user.

16. The method of claim 15 further comprising:
querying a presence server in the real world environment to determine whether the real world user is registered with the communication network.

17. The method of claim 15 further comprising:
identifying charging events during the session;

generating a first charging message in the protocol used in the virtual world environment responsive to a charging event; and transmitting the first charging message to a charging system in the virtual world environment.

18. The method of claim 17 further comprising:

generating a second charging message in the protocol used in the real world environment responsive to a charging event; and transmitting the second charging message to a charging system in the real world environment.

19. The method of claim 15 further comprising:

identifying voice traffic for the session from the virtual world user; and modifying the voice traffic to sound like an avatar that represents the virtual world user in the virtual world environment.

20. The method of claim 15 wherein the communication network comprises an IMS network.

* * * * *

UNITED STATES PATENT AND TRADEMARK OFFICE
CERTIFICATE OF CORRECTION

| | | |
|---|---|---|
| PATENT NO. | : 7,890,638 B2 | |
| APPLICATION NO. | : 11/864981 | |
| DATED | : February 15, 2011 | |
| INVENTOR(S) | : Benco et al. | |

It is certified that error appears in the above-identified patent and that said Letters Patent is hereby corrected as shown below:

IN THE SPECIFICATIONS:
In column 1, line 14, the text "inhibit" should read "inhabit".

Signed and Sealed this
Fifth Day of April, 2011

David J. Kappos
*Director of the United States Patent and Trademark Office*